(12) United States Patent
Gao et al.

(10) Patent No.: US 9,110,738 B2
(45) Date of Patent: Aug. 18, 2015

(54) METHOD AND APPARATUS FOR CALLING BACK A PROGRAM

(71) Applicant: TENCENT TECHNOLOGY (SHENZHEN) COMPANY LIMITED, Shenzhen (CN)

(72) Inventors: Wenjun Gao, Shenzhen (CN); Ming He, Shenzhen (CN); Shi Zhen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/163,275

(22) Filed: Jan. 24, 2014

(65) Prior Publication Data

US 2014/0150000 A1    May 29, 2014

Related U.S. Application Data

(63) Continuation of application No. PCT/CN2012/077711, filed on Jun. 28, 2012.

(30) Foreign Application Priority Data

Jul. 26, 2011   (CN) .......................... 2011 1 0210882

(51) Int. Cl.
   *G06F 9/54*    (2006.01)
   *G06F 9/48*    (2006.01)
   *H04L 29/08*   (2006.01)

(52) U.S. Cl.
   CPC .............. *G06F 9/541* (2013.01); *G06F 9/4843* (2013.01); *G06F 9/543* (2013.01); *G06F 2209/482* (2013.01)

(58) Field of Classification Search
   None
   See application file for complete search history.

(56) References Cited

U.S. PATENT DOCUMENTS

| 2005/0034079 | A1* | 2/2005 | Gunasekar et al. ........... 715/753 |
| 2007/0256003 | A1* | 11/2007 | Wagoner et al. ........... 715/501.1 |
| 2008/0195585 | A1 | 8/2008 | Altberg et al. |
| 2009/0248585 | A1* | 10/2009 | Hsieh et al. ..................... 705/80 |
| 2010/0082769 | A1* | 4/2010 | Bertin et al. .................. 709/217 |
| 2011/0035780 | A1* | 2/2011 | Cedervall et al. ............. 725/110 |

FOREIGN PATENT DOCUMENTS

| CN | 101883184 A | 11/2010 |
| CN | 101969469 A | 2/2011 |
| CN | 102129364 A | 7/2011 |

OTHER PUBLICATIONS

Clinton Jeffery, et al. "A Lightweight Architecture forProgram Execution Monitoring", 1998, pp. 1-8.*
Nigel Davies et al. "Supporting Adaptive Services in a Heterogeneous Mobile Environment", 1994, p. 1-5.*
International Search Report for Application No. PCT/CN2012/077711, dated Sep. 21, 2012.

* cited by examiner

*Primary Examiner* — Lechi Truong
*Assistant Examiner* — Abdou Seye
(74) *Attorney, Agent, or Firm* — Harness, Dickey & Pierce, P.L.C.

(57) ABSTRACT

A method and an apparatus for calling back a program. A receiving module receives calling information delivered by a first program. The calling information includes a target parameter of a second program to be called and a parameter indicating an application identity (APPID) of the first program. A processing module calls the second program by using the target parameter, and establishes an icon for quickly calling back the first program. The icon is corresponding to the APPID. A returning module returns to the first program by using the APPID after receiving an instruction triggered by an operation on the icon.

15 Claims, 2 Drawing Sheets

METHOD AND APPARATUS FOR CALLING BACK A PROGRAM

CROSS-REFERENCE TO RELATED APPLICATIONS

This application is a continuation of International Patent Application No. PCT/CN2012/077711 filed on Jun. 28, 2012. This application claims the benefit and priority of Chinese Patent Application No. 201110210882.0, filed Jul. 26, 2011. The entire disclosures of each of the above applications are incorporated herein by reference.

FIELD

The present disclosure relates to data processing devices and to a method and an apparatus for calling back a program.

BACKGROUND

This section provides background information related to the present disclosure which is not necessarily prior art.

Data processing devices, such as computers, intelligent mobile phones, palm computers, tablet computers, and the like, are becoming more and more popular. Various programs running on the data processing devices have also undergone explosive growth. Two programs installed in a data processing device may call each other by using a programming interface provided by an operating system running in the data processing device. In data processing, a process of program A calling program B is often referred to as "calling", and a subsequent process of program B calling program A after finishing processing is referred to as "calling back".

In conventional art, when program A calls program B, program B may be displayed on top of the window of program A, which makes the process of program B calling back program A rather complex and time-consuming. For example, after program A calls program B in a mobile phone, the window of program B is displayed on top of the window of program A. If the user wants to call the window of program A from the window of program B, the user has to press a switching key provided by the operating system (e.g., in a scenario of switching between multiple programs in an Android operating system) for a long time or to double-click on a HOME key of an operating system (e.g., in a scenario of switching between multiple programs in an operating system in an iPhone) and the like to return to program A.

Therefore, a conventional program call-back process requires a switching process in an operating system, which is complex and time-consuming, and a quick program call-back cannot be implemented.

SUMMARY

This section provides a general summary of the disclosure, and is not a comprehensive disclosure of its full scope or all of its features.

Various embodiments provide a method and an apparatus for calling back a program to implement quick program call-back.

Technical schemes provided by various embodiments are as follows.

A method for calling back a program may include:
receiving calling information delivered by a first program which includes a target parameter of a second program to be called and a parameter indicating an application identity (APPID) of the first program;
calling the second program by using the target parameter, establishing an icon corresponding to the APPID for quickly calling back the first program; and
returning to the first program by using the APPID after receiving an instruction triggered by an operation on the icon.

An apparatus for calling back a program may include:
a receiving module, receiving calling information delivered by a first program which includes a target parameter of a second program to be called and a parameter indicating an application identity (APPID) of the first program;
a processing module, calling the second program by using the target parameter, and establishing an icon corresponding to the APPID for quickly calling back the first program; and
a returning module, returning to the first program by using the APPID after receiving an instruction triggered by an operation on the icon.

A storage medium stores software programs for executing the method according to various embodiments.

It can be seen from the above technical scheme that compared with the conventional art, the method and apparatus for calling back a program establishes an icon for quickly calling back the first program, thereby realizing calling back a first program with one operation without having to undergo a complex switching process at the operating system after the first program calls a second program. The program call-back process is simple and fast, thus improving user experience.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Technical schemes provided by various embodiments are hereinafter described clearly and completely in detail with reference to the accompanying drawings. It should be understood that the embodiments described are merely some embodiments of the present invention, not all of the embodiments. Based on the embodiments of the present invention, other embodiments obtained by one skilled in the art without any inventive work done are still within the protection scope of the present invention.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
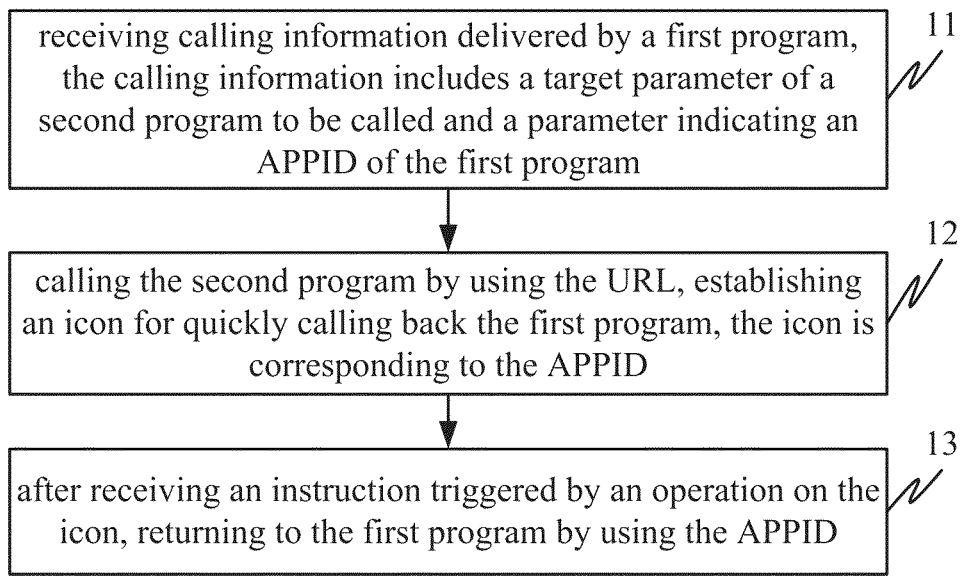
FIG. 1 is a flowchart illustrating a method for calling back a program according to various embodiments.

As shown in FIG. 1, a method for calling back a program according to various embodiments may include the following procedures.

In block 11, calling information delivered by a first program is received. The calling information may include a target parameter of a second program to be called and a parameter indicating an application identity (APPID) of the first program.

In block 12, the second program is called by using the target parameter, and an icon corresponding to the APPID is established for quickly calling back the first program.

In block 13, the first program is called back by using the APPID after an instruction triggered by an operation on the icon is received.

The target parameter of the second program to be called may be defined according to the type of the second program. For example, when the second program is a browser program, the target parameter may be a Uniform Resource Location (URL); when the second program is an audio/video player, the target parameter may be a full path of an audio/video file; when the second program is a document editing program, the target parameter may be a full path of a document file, and so on.

For example, supposing the first program is an instant messaging (IM) tool installed in a mobile terminal, e.g., a mobile phone, and the second program is a browser program installed in the mobile phone, a user clicks on a link provided in an interface of the IM tool in the mobile phone to call the browser program, the IM tool delivers a URL and an APPID. The URL indicates the webpage the IM tool requires the browser program to open, and the APPID indicates an ID of the IM tool in the operating system. The browser program establishes an icon for quickly calling back the IM tool. The user may click on the icon, and when an instruction triggered by an operation on the icon is received, the IM tool may be quickly called back.

The icon may be configured in the browser program by default.

From the above technical scheme it can be seen that the method for calling back a program establishes an icon for quickly calling back the first program, thereby the first program can be quickly called back after the second program is called. The program call-back process is simple, fast, thus improving user experience.

In various embodiments, the calling information delivered by the first program in block 11 may also include a parameter indicating an icon of the first program. The procedure of establishing an icon for quickly calling back the first program in block 12 may include establishing an icon corresponding to the APPID for quickly calling back the first program by using the parameter indicating the icon of the first program and the APPID.

In various embodiments, supposing the first program is an IM tool and the second program is a browser, the browser establishes an IM icon for quickly calling back the IM tool so that the user may click on the IM icon to quickly call back the IM tool.

Therefore, the icon established is the icon of the IM tool, and this is in accordance with using habits of users. The icon for the IM tool is self-evident, and facilitates usage of users.

In various embodiments, the calling information delivered by the first program received in block 11 may also include a parameter indicating an application name (APPNAME) of the first program, and the method may also include generating prompting text corresponding to the icon by using the APPNAME after the icon is established.

For example, supposing the first program is an IM tool and the second program is a browser, the APPNAME is the name of the IM tool "IM tool for mobile phone", the browser establishes an icon for quickly calling back the IM tool, and user prompting text "click here to return to the IM tool for mobile phone" may be displayed together with the icon. In various embodiments, the user prompting text may be displayed in a bubble window.

In various embodiments, the calling information delivered by the first program received in block 11 may also include a parameter indicating a return ID RETURN_ID of the first program. The method may also include, when returning to the first program, determining a mode of calling back the first program by using the RETURN_ID, and returning to the first program according to the mode.

For example, supposing the first program is an IM tool and the second program is a browser, the browser may determine a method of processing quickly calling back the IM tool by using the RETURN_ID, e.g., when the RETURN_ID=1, displaying a chatting window of the IM tool; when the RETURN_ID=2, displaying information of an IM contact, and the like.

In various embodiments, when the second program is a browser, the calling information delivered by the first program received in block 11 may also include a parameter indicating a browser kernel. The method may also include, when calling the second program, determining a browser kernel used for calling the browser by using the parameter indicating a browser kernel. For example, the parameter indicating a browser kernel may be WEBKIT. WEBKIT is an open source browser kernel. Other browser kernels include Gecko (used by Mozilla Firefox and etc.), Trident (also called MSHTML, which is used by IE).

When the parameter indicating a browser kernel is WEBKIT, it may be determined that the second program is called by using WEBKIT according to the parameter WEBKIT, i.e., specifying that the IM browser in the mobile phone opens the webpage by using the WEBKIT kernel.

For example, supposing the first program is an IM tool and the second program is a browser, when the parameter is WEBKIT, it is determined a browser using WEBKIT kernel is used.

In various embodiments, the calling information delivered by the first program received in block 11 may also include a parameter indicating a new window, e.g., NEWTAB, and the method may also include, when calling the second program, determining a new window is to be used for calling the second program according to the parameter NEWTAB.

For example, supposing the first program is an IM tool and the second program is a browser, when the parameter is NEWTAB, it is determined that a new window is used for calling the browser, i.e., using a new window to open the webpage. In various embodiments, it may be specified that the IM browser opens the webpage in an existing window.

It can be seen from the above technical scheme that after a first program calls a second program, the first program can be quickly called back by establishing an icon for quickly calling back the first program, thus avoiding a switching process in the operating system. Such inter-program calling and call-back provides better user experience, reduces costs for switching between programs, is good for inter-program calling and call-back, increases interactions between programs, and is especially valuable for calling and call-back between programs produced by the same company.

Figure 2:
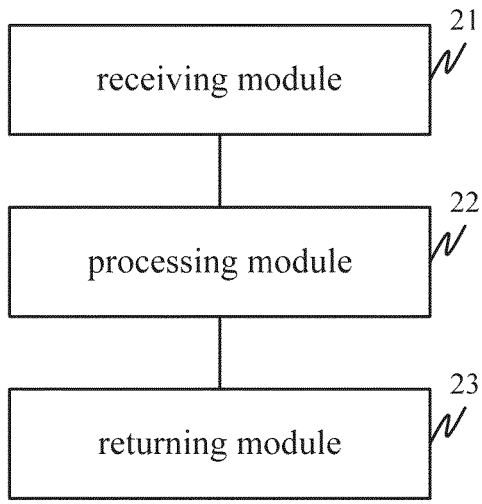
FIG. 2 is a diagram illustrating a structure of an apparatus for calling back a program according to various embodiments.

As shown in FIG. 2, an apparatus for calling back a program corresponding to the above method for calling back a program may include the following components.

A receiving module 21 receives calling information delivered by a first program. The calling information may include a target parameter of a second program to be called and a parameter indicating an application identity (APPID) of the first program.

A processing module 22 calls the second program by using the target parameter, and establishes an icon corresponding to the APPID for quickly calling back the first program.

A returning module 23 returns to the first program by using the APPID after receiving an instruction triggered by an operation on the icon.

The target parameter of the second program called may be defined according to the type of the second program. In various embodiments, when the second program is a browser program, the target parameter may be a URL; when the second program is an audio/video player, the target parameter may be a full path of an audio/video file; when the second program is a document editing program, the target parameter may be a full path of a document file, and so on.

For example, supposing the first program is an IM tool and the second program is a browser, a user may click on a link provided in an interface of the IM tool to call the browser. The IM tool delivers a URL and an APPID of the IM tool. The URL indicates a webpage that the IM tool requires the browser to open, and the APPID is the ID of the IM tool in the operating system. The browser establishes an icon for quickly calling back the IM tool so that the user may click on the icon to quickly call back the IM tool. The icon may be configured in the browser program by default.

The apparatus for calling back a program according to various embodiments may be configured to stand alone or in a mobile phone.

From the above technical scheme it can be seen that a first program can be quickly called back after a second program is called by establishing an icon for quickly calling back the first program. The program call-back process is simple, and fast, thus improving user experience.

In various embodiments, the calling information received by the receiving module 21 may also include a parameter indicating an icon of the first program. The processing module 22 may establish an icon for quickly calling back the first program according to the parameter indicating the icon of the first program. The icon is corresponding to the APPID.

In various embodiments, supposing the first program is an IM tool and the second program is a browser, the browser establishes an IM icon for quickly calling back the IM tool so that the user may click on the IM icon to call back the IM tool.

Therefore, the icon established is the icon of the IM tool, and this is in accord with using habits of users. The icon for the IM tool is self-evident, and facilitates usage of users.

In various embodiments, the calling information of the receiving module 21 may also include a parameter indicating an application name APPNAME of the first program. The processing module 22 may generate user prompting text corresponding to the icon generated by using the parameter indicating the APPNAME.

For example, supposing the first program is an IM tool and the second program is a browser, the APPNAME is the name of the IM tool "IM tool for mobile phone", the browser establishes an icon for quickly calling back the IM tool, and user prompting text "click here to return to the IM tool for mobile phone" may be displayed together with the icon. In various embodiments, the user prompting text may be displayed in a bubble window.

In various embodiments, the calling information received by the receiving module 21 may also include a parameter indicating a return identity RETURN_ID for returning to the first program. The returning module 23 may determine a mode of quickly calling back the first program by using the RETURN_ID, and calling back the first program according to the mode.

For example, supposing the first program is an IM tool and the second program is a browser, the browser may determine a method of processing quickly calling back the IM tool by using the RETURN_ID, e.g., displaying a chat window of the IM tool or displaying information of an IM contact, and the like.

In various embodiments, the calling information received by the receiving module 21 may also include a parameter NEWTAB. The processing module 22 may determine to use a new window to call the second program according to the parameter NEWTAB.

For example, supposing the first program is an IM tool and the second program is a browser, when the parameter is NEWTAB, it is determined a new window is used for calling the browser, i.e., using a new window to open the webpage. In various embodiments, it may be specified that the browser use an existing window to open the webpage.

In various embodiments, when the second program is a browser, the calling information may include a parameter indicating a browser kernel. The processing module 22 may determine that a browser kernel is used for calling the second program by using the parameter indicating the browser kernel.

For example, the parameter indicating a browser kernel may be WEBKIT, Gecko or Trident to respectively call the WEBKIT kernel, the Gecko kernel or the Trident kernel.

For example, when the calling information received by the receiving module 21 may also include a parameter indicating WEBKIT, the processing module 22 may determine to use the WEBKIT kernel to call the browser according to the parameter indicating WEBKIT.

For example, supposing the first program is an IM tool and the second program is a browser, it may be determined that a browser uses WEBKIT kernel according to a parameter indicating WEBKIT.

It can be seen from the above technical scheme that after a first program calls a second program, the first program can be quickly called back by establishing an icon for quickly calling back the first program, thus avoiding a switching process in the operating system. Such inter-program calling and call-back provides better user experience, reduces costs for switching between programs, is good for inter-program calling and call-back, increases interactions between programs, and is especially valuable for calling and call-back between programs produced by the same company.

The structure and function of the apparatus for calling back a program can be obtained according to the method according to various embodiments, thus are not described further herein.

Figure 3:
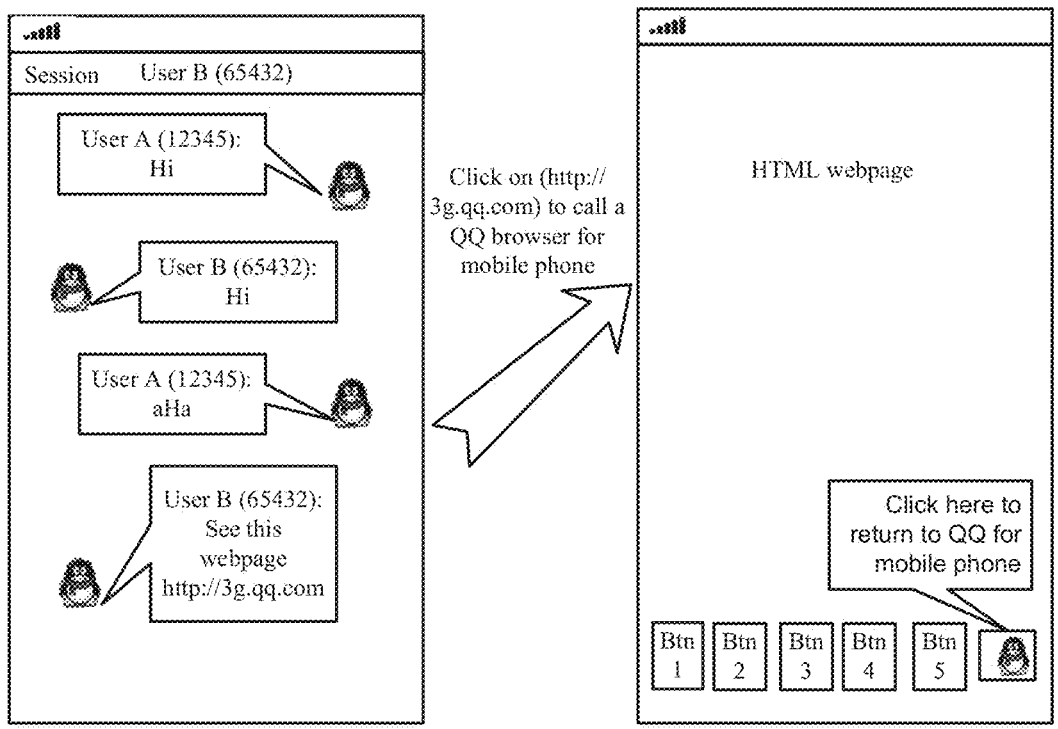
FIG. 3 is a diagram illustrating an application scenario of a method for calling back a program according to various embodiments.
Figure 4:
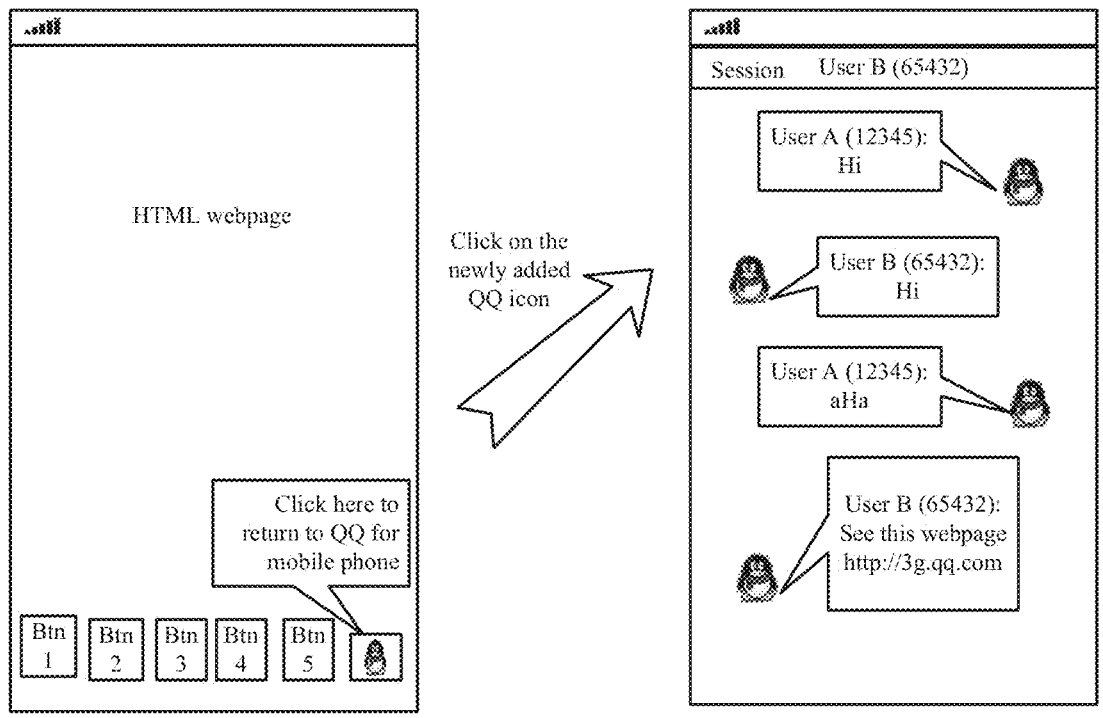
FIG. 4 is a diagram illustrating an application scenario of a method for calling back a program according to various embodiments.

The following describes a method for calling back a program by taking quickly calling back an IM tool after the IM tool calls a browser as an example and by referring to the application scenarios as shown in FIG. 3 and FIG. 4.

FIG. 4 illustrates a simplified display interface of a mobile phone. User A (whose IM ID is 12345) is chatting using the IM tool for mobile phone with user B (whose IM ID is 65432).

User A clicks on a link (http://3g.qq.com) provided on the IM chat interface to call a browser to visit the HTML webpage. The IM tool delivers an URL, an APPID, an APPNAME, a NEWTAB, a WEBKIT, an ICON and a RETURN_ID. The URL indicates the address of the webpage that the IM tool requires the browser to open. The APPID is the ID of the IM tool in an operating system. The APPNAME indicates the name of the IM tool, e.g., "IM tool for mobile phone". The NEWTAB instructs the IM browser to open the webpage using a new window. The WEBKIT instructs the browser to use a WEBKIT kernel. The ICON indicates an icon of the IM tool. The RETURN_ID indicates calling back a chat interface of the IM tool.

An HTML webpage covers the chat interface of the IM tool, and an icon for the IM tool is added in the bottom bar of the browser for quickly calling back the IM tool. As shown in FIG. 3, the original bottom bar of the browser includes 5 buttons (button 1 to button 5). The icon for the IM tool is newly added as the rightmost button, therefore there are in total 6 buttons. User prompting text "click here to return to IM tool" is displayed at the location of the icon for the IM tool in a bubble window.

In the simplified display interface of the mobile phone as shown in FIG. 4, user A may click on the newly added icon for the IM tool to return to the IM tool. The chatting interface with user B is quickly called back, and the call-back process is completed.

In various embodiments, the user may slide the icon of the IM tool to recover the normal 5 buttons. The user may continue browsing webpages in the IM browser.

The IM tool may call the browser by using a public program interface provided by the operating system.

From the above technical scheme it can be seen that an IM tool can be quickly called back after a browser is called by establishing an icon for quickly calling back the IM tool. The program call-back process is simple, and fast, thus improving user experience.

Through the above various embodiments, it is apparent the system, the apparatus and the method may be implemented in other manners. For example, the apparatus of the above embodiments are merely for illustrative purposes. The classification of the modules is based on logical functions. In practice, other classification manners may be used to define the modules, e.g., multiple modules or components may be combined or integrated into one system, or some features may be omitted. In addition, the inter-connections or direct connections or communication links between apparatuses or modules may be electrical interfaces or mechanical interfaces or in other forms.

Modules that are described as a standalone component may not be standalone physically. Components shown as modules may be or may not be physical units, i.e., may locate in the same location or be distributed to multiple network units. The technical scheme may be implemented by some or all of the modules selected according to the needs.

The modules in the above various embodiments may be integrated into one processing unit, or stand alone as separate physical entities. Or, two or more modules may be integrated into one module. An integrated module may be implemented by hardware or as software functional units.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

An integrated unit may be stored in a computer-readable storage medium when implemented as software functional units and sold and used as an independent product. Substantials of the technical scheme of the present disclosure or those features making contributions to the conventional art or some or all of the technical schemes may be embodied by a software program. The software program is used for implementing various embodiments of the method and functional units of the apparatus according to the present disclosure. The software program may be stored in a storage medium which includes instructions to cause a computing device (e.g., a PC, a server or a network device) to execute some or all of the steps of the method according to various embodiments. The storage medium is capable of storing program codes, such as a flash disk, a ROM, a RAM, a magnetic disk, a compact disk, and so on. The computing device may include a processor (e.g., a CPU or a microprocessor) and a memory. The memory may store instructions which make the processor implement the mechanism of various embodiments.

The scope of the claims should not be limited by the embodiments set forth in various embodiments, but should be given the broadest interpretation consistent with the description as a whole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for calling back a program, comprising:
receiving calling information delivered by a first program which includes a target parameter of a second program to be called and a parameter indicating an application identity (APPID) of the first program;
calling the second program by using the target parameter, displaying a user interface of the second program, establishing an icon corresponding to the APPID for quickly calling back the first program in the user interface of the second program; and
calling the first program by using the APPID and displaying a user interface of the first program after receiving an instruction triggered by an operation on the icon; and
wherein the calling information further comprises a parameter indicating a return identity (RETURN ID) specifying one of plural user interfaces of the first program; wherein the displaying a user interface of the first program which is specified by the RETURN ID; and/or the calling information further comprises a parameter indicating a new window (NEWTAB), and the method further comprises: determining to use a new window to call the second program according to the parameter indicating a NEWTAB when calling the second program.

2. The method of claim 1, wherein the calling information further comprises a parameter indicating an icon of the first program; the step of establishing an icon for the first program comprises: establishing an icon for quickly calling back the first program by using the parameter indicating an icon of the first program.

3. The method of claim 1, wherein the calling information further comprises a parameter indicating an application name (APPNAME) of the first program; the method further comprises: generating user prompting text corresponding to the icon according to the APPNAME after establishing the icon for quickly calling back the first program.

4. The method of claim 1, wherein the first program comprises an instant messaging (IM) tool, the second program comprises a browser, and the target parameter of the second program to be called includes a uniform resource location (URL).

5. The method of claim 4, wherein the calling information further comprises a parameter indicating a browser kernel, the method further comprises determining a browser kernel to be used in calling the browser by using the parameter indicating a browser kernel when calling the second program.

6. An apparatus for calling back a program,
comprising: one or multiple processors and memory having instructions stored thereon, the instructions, when executed by the one or multiple processors, cause the processors to perform operations comprising:
receiving calling information delivered by a first program which includes a target parameter of a second program to be called and a parameter indicating an application identity (APPID) of the first program;
calling the second program by using the target parameter, displaying a user interface of the second program, and establishing an icon in the user interface of the second program for quickly calling back the first program, wherein the icon is corresponding to the APPID;
calling the first program by using the APPID and displaying a user interface of the first program after receiving an instruction triggered by an operation on the icon; and
wherein the calling information further comprises a parameter indicating a return identity (RETURN ID) specifying one of plural user interfaces of the first program; the instructions cause the processors to perform operations comprising: displaying a user interface of the first program which is specified by the RETURN ID after receiving the instructions; and/or the calling information further comprises a parameter indicating a new window (NEWTAB), and the instructions cause the processors to perform operations determining to use a new window to call the second program according to the parameter indicating a NEWTAB when calling the second program.

7. The apparatus of claim 6, wherein the calling information further comprises a parameter indicating an icon of the first program; the instructions cause the processors to perform operations comprising establishing an icon for quickly calling back the first program according to the parameter indicating an icon of the first program.

8. The apparatus of claim 6, wherein the calling information further comprises a parameter indicating an application name (APPNAME) of the first program; the instructions cause the processors to perform operations comprising: generating user prompting text corresponding to the icon by using the APPNAME after establishing the icon for quickly calling back the first program.

9. The apparatus of claim 6, wherein the first program comprises an instant messaging (IM) tool, the second program comprises a browser, and the target parameter of the second program to be called includes a uniform resource location (URL).

10. The apparatus of claim 9, wherein the calling information further comprises a parameter indicating a browser kernel, the instructions cause the processors to perform operations comprising: determine a browser kernel to be used in calling the browser by using the parameter indicating a browser kernel when calling the second program.

11. A non-transitory storage medium, storing a software program providing instructions to direct at least one processor to perform the acts of:
receiving calling information delivered by a first program which includes a target parameter of a second program to be called and a parameter indicating an application identity (APPID) of the first program;
calling the second program by using the target parameter, displaying a user interface of the second program, establishing an icon corresponding to the APPID for quickly calling back the first program in the user interface of the second program;
calling the first program by using the APPID and displaying a user interface of the first program after receiving an instruction triggered by an operation on the icon; and
wherein the calling information further comprises a parameter indicating a return identity (RETURN ID) specifying one of plural user interfaces of the first program; the instructions further directs the at least one processor to perform the acts of: displaying a user interface of the first program which is specified by the RETURN ID after receiving the instructions; and/or the calling information further comprises a parameter indicating a new window (NEWTAB), and the method further comprises: determining to use a new window to call the second program according to the parameter indicating a NEWTAB when calling the second program.

12. The non-transitory storage medium of claim 11, wherein the calling information further comprises a parameter indicating an icon of the first program; the step of establishing an icon for the first program comprises: establishing an icon for quickly calling back the first program by using the parameter indicating an icon of the first program.

13. The non-transitory storage medium of claim 11, wherein the calling information further comprises a parameter indicating an application name (APPNAME) of the first program; the instructions further directs the at least one processor to perform the acts of: generating user prompting text corresponding to the icon according to the APPNAME after establishing the icon for quickly calling back the first program.

14. The non-transitory storage medium of claim 11, wherein the first program comprises an instant messaging (IM) tool, the second program comprises a browser, and the target parameter of the second program to be called includes a uniform resource location (URL).

15. The non-transitory storage medium of claim 14, wherein the calling information further comprises a parameter indicating a browser kernel, the instructions further directs the at least one processor to perform the acts of: determining a browser kernel to be used in calling the browser by using the parameter indicating a browser kernel when calling the second program.

* * * * *